June 13, 1950  F. D. JOESTING  2,511,340
CONTROL APPARATUS
Filed May 29, 1947
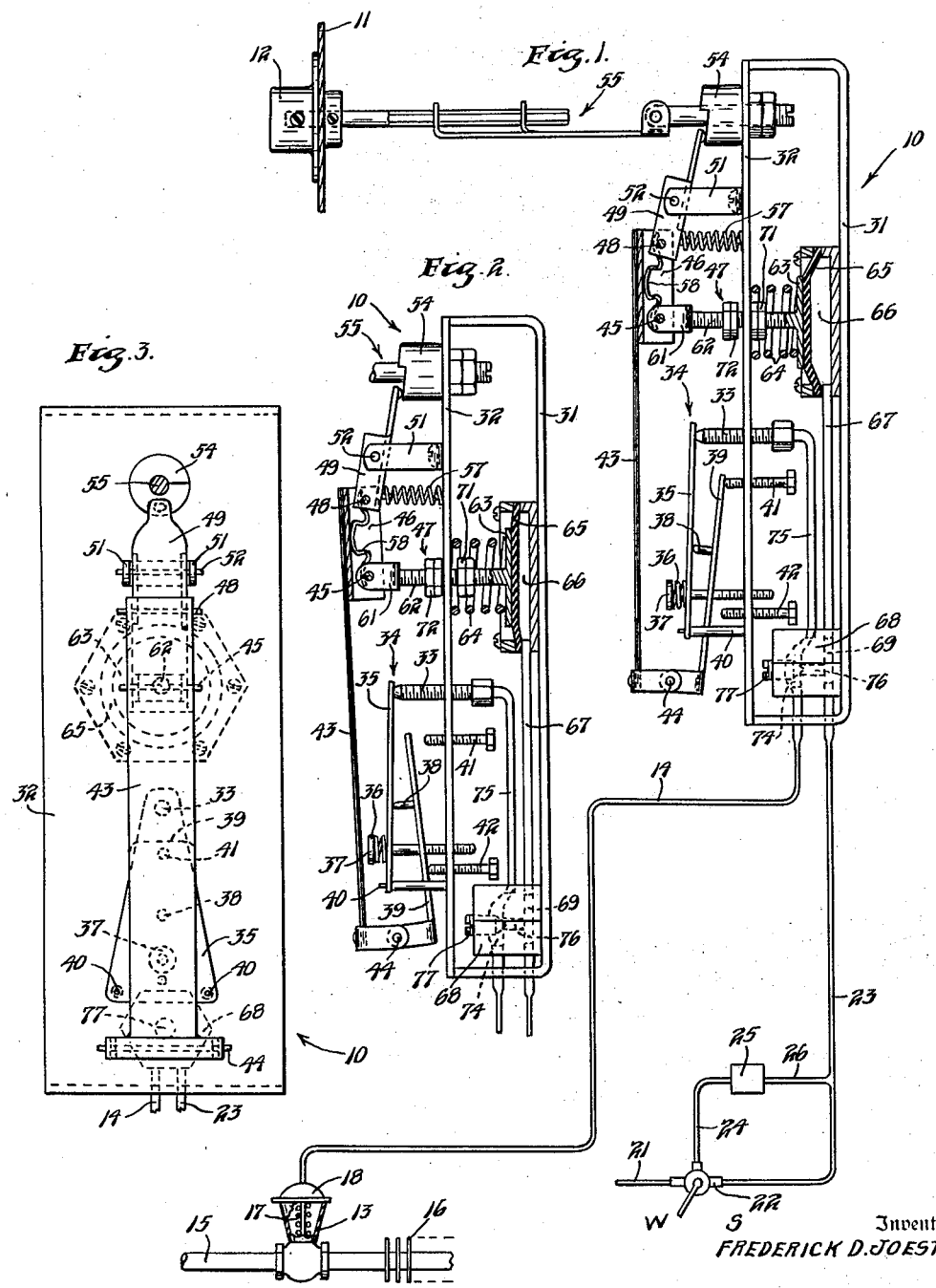
Inventor
FREDERICK D. JOESTING
By
George H. Fisher
Attorney Patented June 13, 1950

2,511,340

UNITED STATES PATENT OFFICE 2,511,340

CONTROL APPARATUS

Frederick D. Joesting, Oak Park, Ill., assignor to Minneapolis-Honeywell Regulator Company, Minneapolis, Minn., a corporation of Delaware Application May 29, 1947, Serial No. 751,355

9 Claims. (Cl. 236—1)

The present invention relates to a pneumatic thermostat or the like selectively operable in a direct or a reverse sense by changing the main supply pressure and is an improvement over my prior Patent 2,310,293, issued February 9, 1943.

In temperature changing and controlling systems, it is sometimes desirable to circulate heating medium through piping and heat exchangers during the winter months and to circulate cooling medium through the same piping and heat exchangers during the summer months. When valves or other means are used to control the circulation of the heating medium in response to temperature changes of a space, it is obvious that the valves must be controlled to restrict flow on a temperature rise during the heating period and to increase the flow on a temperature rise during the cooling period. Thermostats have been made which are effective to control such valves in one sense when supplied with air under a predetermined pressure and which function in a reverse sense when supplied with air at an appreciably different pressure, but these prior art devices are not completely satisfactory and are relatively complex and costly to manufacture. It is therefore an object of this invention to provide a simple and improved reversible thermostat for controlling both heating and cooling systems.

It is a further object to provide an easily reversible thermostat using a single temperature responsive element and a single control mechanism.

It is an additional object to provide a summer-winter thermostat having only a single control knob and wherein the summer-winter control points may be adjusted so that the throttling ranges overlap or so that said ranges may be separated a desired amount.

It is also an object to provide a controller of the sort described wherein the control points for summer or winter operation may be so close together that the throttling ranges overlap, yet the operating sense of the device cannot be accidentally reversed under any reasonable operating conditions.

It is a more limited object to provide a controller that can be caused to operate in a reverse manner by shifting the effective pivot point of a portion of the controller mechanism.

It is a somewhat similar object to provide a controller including a pivoted lever member wherein the manner of operation of the device may be reversed by changing the class of the lever member.

It is an additional object to provide a pneumatic control device which may be caused to operate in a predetermined and different manner by changing the relative operating position of the condition responsive element by changing the main supply air pressure.

These and other objects will become apparent upon a study of the following specification and drawing wherein:

Figure 1 is a schematic showing of a control system using the present thermostat, with parts of the thermostat being in section.

Figure 2 is a side elevation view of the thermostat similar to Figure 1 but with certain parts differently adjusted.

Figure 3 is a front elevation view of the thermostat in Figures 1 and 2.

The present thermostat 10 is designed for installation within a room air conditioning unit or cabinet, shown in part at 11, in a position to respond to return air temperature, and the adjusting knob 12 is arranged on the outside of the cabinet 11 for manual manipulation. Obviously, this is only a specific adaptation of the present thermostat and it is contemplated that it may be provided with a conventional case and adjusting means for mounting on the wall of a room, or the like, if desired.

In Figure 1, thermostat 10 is connected in controlling relation to a normally open pressure operated valve 13 by pipe or tubing 14, the valve 13 controlling the flow of temperature changing medium through pipe 15 and heat exchanger 16, heat exchanger 16 preferably being located within cabinet 11. Valve 13 is conventional and is urged open by a compression spring 17 which is opposed by a pneumatic motor 18, the operative position of the valve 13 depending upon the air pressure exerted on the motor 18. The spring 17 and motor 18 of valve 13 are so adjusted that with 12 pounds per square inch pressure on the motor, for instance, valve 13 is closed; with 2 pounds pressure it is wide open, and with intermediate air pressures, intermediate valve positions result.

Thermostat 10 is supplied with air from a suitable source, such as a compressor, not shown, through pipe 21, three-way valve 22, and pipe or tube 23, with an alternative connection being provided through three-way valve 22, pipe 24, pressure reducing valve 25 and pipe 26 to pipe 23. For convenience in this description, it may be assumed that the supply pressure for pipe 21 is at 17 pounds per square inch and that pressure reducing valve 25 is adjusted to provide 13 pounds per square inch pressure in pipe 26. With the handle of valve 22 adjusted to its winter position, as shown, pipe 21 is in direct communication with pipe 23 and pipe 24 is shut off, pipe 23 thus being supplied with air at 17 pounds. When the handle is adjusted to its summer position, pipe 23 is shut off at its lower end and a passage is opened between pipes 21 and 24, hence pipe 23 is supplied with air at 13 pounds due to reducing valve 25. The air passages in the thermostat 10, the manner in which the thermostat varies the pressure in pipe 14, and the reversing of the action of the thermostat by changing the supply line pressure, will become apparent in the detailed description of said thermostat.

Thermostat 10 includes a mounting plate 31 adapted to be attached to the inside of cabinet 11, or on a wall or the like, and to which base member 32 is suitably secured in spaced relation. Nozzle 33 of control mechanism or valve 34 is adjustably mounted on base member 32 and is arranged to cooperate with a valve plate 35. Valve plate 35 is movably mounted on a pair of hinge pins 40 at its lower end and bears against nozzle 33 at its upper end, plate 35 being preferably substantially parallel to base member 32 so that it may squarely engage the end of nozzle 33 in its closing position. Plate 35 is normally held in closed position by a light coil spring 36 adjustably carried by bolt 37 screwed into base member 32.

Valve plate 35 may be forced off nozzle 33 by projection 38 of lever 39 when said lever 39 is sufficiently rotated about either of fulcrum members 41 or 42. Lever 39 is connected in operative relation to bimetal element 43 by hinge pin 44, and projection 38 is moved against plate 35 in a valve opening direction when lever 39 is rotated about fulcrum member 41, as in Figure 1, by an outward movement of bimetal 43. Bimetal 43, for the purpose of this disclosure, is arranged with its high expansion side on the outer side hence a rise in temperature will cause the lower end to move inwardly, while a decrease in temperature will cause said lower end to move outwardly. When lever 39 is rotated about fulcrum 42, as in Figure 2, outward movement of bimetal 43 tends to move projection 38 away from plate 35 and thus permits closing of valve 34. The change in direction of movement of projection 38 when lever 39 is fulcrumed about a different one of fulcrum members 41 and 42, although bimetal 43 moves in the same direction, is due to the well known disposition of forces acting on lever 39 when it functions as a second class lever when fulcrumed on 41 and as a first class lever when fulcrumed on 42.

The upper end of bimetal 43 is secured to a bracket member 46 which is pivotally attached at its lower end by pin 45 to an adjustable support 47. The upper end of the bracket 46 is secured by hinge pin 48 to an adjustable lever 49 which in turn is secured to supports 51 by hinge pin 52. The upper end of lever 49 bears against cam 54 connected by shaft 55 to adjusting knob 12 for rotation thereby. Rotation of cam 54 moves the upper end of lever 49 in or out and thus shifts the upper end of bimetal 43 in an opposite direction. Shifting the upper end of bimetal 43, assuming that support 47 is fixed, shifts the lower end of the bimetal and requires a different temperature to cause operation of valve 34, thus knob 12 is effective to change the control point of the thermostat. The rise of cam 54 is considerably more than is necessary for ordinary adjustments, the extra rise being provided for calibrating the instrument. The calibrating may be done by adjusting cam 54 until the thermostat 10 controls to a selected control point. Then, without further adjustment of the cam 54, knob 12 is adjusted on shaft 55 until it indicates said control point, the set screw of the knob then being tightened. While this calibrating procedure is essentially correct, minor changes in the procedure may be used in quantity production. Compression spring 57 is arranged under the lower end of lever 49 to insure that the other end of said lever will remain in engagement with cam 54 at all times, and spring 58 is provided to take up any lost motion that may exist at hinge pins 45 and 48.

Although support 47 is assumed to be fixed in the above discussion, it is actually adjustable to either of two positions. Support 47 includes a hinge bracket 61, through which pin 45 extends, secured to the outer end of member 62, the other end of member 62 being attached to a disk 63. Disk 63 is arranged between a compression spring 64 and a flexible diaphragm 65, diaphragm 65 forming a movable wall of a pressure chamber 66. Pressure chamber 66 is connected by tube 67 to junction block 68 wherein passage 69 connects tube 67 to pipe 23, so that the supply line air pressure is imposed on said chamber and said diaphragm. Diaphragm 65 and spring 64 are so proportioned that a pressure of 17 pounds per square inch in chamber 66 will cause movement of disk 63 and member 62 to the left against the force of spring 64, this motion being limited by locknuts 71 which serve as an adjustable stop; hence a 17 pound pressure in chamber 66 positions bimetal 43 to a left extreme, as shown in Figure 1, and requires that lever 39 pivot about fulcrum member 41. A 13 pound per square inch pressure in chamber 66 is low enough to be overcome by spring 64, hence disk 63 and member 62 are forced to the right until stopped by locknuts 72, as in Figure 2, which form the other limit stop for member 62. When member 62 is shifted to its right extreme, support 47 is then effectively fixed in a different position and the lower end of the bimetal 43 is moved inward sufficiently to require lever 39 to pivot about fulcrum 42.

The amount of movement of bimetal 43 caused by adjusting support 47 is in excess of that caused by cam 54 and, as above pointed out, is sufficient to change the fulcrum point of lever 39. By judicious adjustment of fulcrum members 41 and 42, as well as limit stops 71 and 72, bimetal 43 may be adjusted to operate valve 34 at the same temperature regardless of whether lever 39 is pivoting about 41 or 42. However, it is generally preferred to adjust the present apparatus so that valve 34 will be operated at a slightly higher temperature when lever 39 is pivoted on fulcrum 42 for cooling control than when pivoting about fulcrum 41 for heating control. Because the amount of movement of bimetal 43 required to cause lever 39 to shift from one fulcrum member to another is in excess of the movement of said bimetal due to normal temperature changes or due to adjustments by cam 54, accidental shifting of lever 39 from one fulcrum to the other does not occur.

Since it is preferable to shift the control point to a somewhat higher value for cooling control, for economy and because people prefer higher temperatures in the summer, it is not intended that knob 12 indicate the set point in degrees. Therefore, knob 12 merely has an indicating mark to show the relative adjustment of the knob, and arrows are provided, either on the knob or the cabinet, to show the direction of adjustment for higher or lower control points. Of course, if desired, two scales may be provided, one being for heating control and the other for cooling control, these plates being arranged so that their values are out of alignment by the amount of variation in control point due to changing the operating sense of the device. Thus, with the values assumed in the following description of operation, 70° on the heating control scale plate would align with 74° on the cooling control scale plate. If the device is adjusted to give the same control point on shifting from heating control to cooling control, then a single scale plate is adequate.

In addition to air passage 69 in junction block 68, passage 74 connects tube 14 and tube 75 which extends between block 68 and nozzle 33. A transverse passage 76, restricted by needle valve 77, connects passages 69 and 74 so that air from the supply piping is furnished to the tubing and passages connecting nozzle 33 and motor 18 at a restricted rate. The purpose of these connections, as well as the function of the above thermostat mechanism, will be pointed out in the following description of operation.

Operation

With the apparatus connected as shown in Figure 1, and by assuming certain conditions of temperature and pressure, the operation will now be considered. As described above, with 17 pounds per square inch pressure in pipe 21, equal pressures will exist in tubes 23, passage 69, tube 67 and chamber 66. Because of the 17 pound pressure in chamber 66, support 47 is adjusted to its outermost position with stop 71 engaging base member 32 and, as a function of this adjustment of support 47, lever 39 is adjusted to fulcrum about member 41, as above described.

Assuming that thermostat 10 has a three degree throttling range and is adjusted to close the valve 34 at about 73°, and to fully open it at about 70°, it may now be considered that the space temperature affecting bimetal 43 is about 73° and valve 34 is closed. Because valve 34 is closed, the air fed through passage 76 at a restricted rate cannot escape, hence the pressure at valve 34 and at motor 18 builds up to 17 pounds per square inch. As this is over the 12 pounds required to close valve 13, valve 13 is closed and no heating medium can flow to heat exchanger 16, hence the space temperature should decrease.

As the space temperature falls, and the high expansion outer side of bimetal 43 contracts, the lower end of the bimetal moves outwardly and operates lever 39 to pry valve plate 35 off nozzle 33 sufficiently to permit air to escape to thus cause a drop in air pressure at nozzle 33 and at motor 18. As this pressure drops below 12 pounds, spring 17 is enabled to partially open valve 13 and permit some heating medium to flow to heat exchanger 16. Should the medium be supplied at the exact rate desired to balance the heat loss from the space, equilibrium will result and the apparatus will remain in the position just described. However, if the temperature in the space decreases further, valve 34 is opened wider and the pressure at motor 18 is further diminished, thus further opening valve 13 to supply more heating medium. Should the temperature decrease to 70°, valve 34 will further open, the pressure at nozzle 33 and at motor 18 will go below 2 pounds per square inch and valve 13 will be fully opened. Should the temperature in the space rise, the lower end of bimetal 43 will move inward, valve 34 will be operated toward closed position, pressure will again build up at motor 18 and valve 13 will accordingly be adjusted toward closed position.

Thermostat 10 is operated to effect cooling control by operating valve 22 to its summer position so that the air supplied tube 23 must pass through reducing valve 25, hence the supply pressure, and that in chamber 66, is 13 pounds instead of the previous 17 pounds. At the same time, suitable apparatus, not shown, is operated to supply cooling medium to pipe 15 instead of the heating medium discussed above.

With a 13 pound pressure in chamber 66, support 47 is moved to its right extreme by spring 64, as in Figure 2, so that stop 72 engages base member 32. This shifts bimetal 43 enough to cause lever 39 to fulcrum about 42 and, assuming that the apparatus is so adjusted that the shift from a heating control cycle to a cooling control cycle raises the control point four degrees, it may be assumed that valve 34 will be closed at 74° and fully open at 77° hence, since valve 34 is closed in Figure 2, it may be further assumed that the temperature affecting bimetal 43 is 74° or lower. With valve 34 closed, 13 pounds air pressure is imposed on motor 18 of valve 13, hence the valve 13 is closed and no cooling medium can circulate to heat exchanger 16.

Should the space temperature now rise, the lower end of bimetal 43 will move inward, as before, but lever 39, because it is now fulcrumed on 42, will operate to open valve 34. Opening valve 34 reduces the pressure imposed on motor 18 and thus causes opening of valve 13 to permit a flow of cooling medium to heat exchanger 16. Likewise, when sufficient cooling medium is being supplied to cause a drop in temperature, the outer side of bimetal 43 contracts and the lower end moves outwardly, thus tending to move projection of 38 of lever 39 away from valve plate 35 and permitting closure of valve 34. Closing valve 34 permits pressure to build up at motor 18 and thus closes valve 13 to prevent further circulation of cooling medium to heat exchanger 16.

While the action of the present apparatus has been discussed in terms of opening and closing of valves 34 and 13, it is believed obvious from the disclosure that valve 34 will generally be partly open and the pressure imposed on motor 18 of valve 13 will be such that the valve will be sufficiently open to supply temperature changing medium at a rate to maintain substantially uniform temperatures, the present apparatus, on either cycle, functioning as a conventional proportioning control system. However, it seems obvious that an on-off thermostat may be reversed in the manner described and it is further contemplated that control mechanism other than a valve and shifting means other than a pressure chamber may be used. Further, the control point valves used in the description of the operation are only illustrative and any other desired valves, for either summer or winter control, may be obtained by suitably adjusting knob 12.

As many substitutions and equivalents seem feasible in the practice of this invention, its scope is to be determined only by the appended claims.

I claim:

1. A thermostat comprising, in combination, a base member, an adjustable cam means arranged on said base member, a pivotally mounted lever having one end bearing against said cam means, a bimetal strip pivotally attached to the other end of said lever, a flapper valve means, a lever having an intermediate portion for actuating said valve means, hinge means for attaching one end of said lever to said bimetal strip, a pair of spaced fulcrum members attached to said base member and arranged so that one of said members may fulcrum said lever on one side of said valve actuating portion and the other may fulcrum said lever on the other side of said valve actuating portion, and pressure responsive means for moving said bimetal strip to either of two working positions, one of the working positions requiring the use of one of said fulcrum members and the other position requiring the use of the other of said fulcrum members.

2. A thermostat comprising, in combination, a temperature responsive element, a valve adjusting means including a lever pivotally attached to said element for operation thereby, said lever including an intermediate valve actuating portion, a pair of stationary fulcrum members arranged to coact with said lever on opposite sides of said actuating portion so that said lever may be operated either as a first class lever or as a second class lever by pivoting about one or the other of said fulcrum members for adjusting the valve means, and pressure responsive means for shifting said element relative to said fulcrum members so that a selected one of said fulcrum members is effective for fulcruming said lever.

3. A summer-winter thermostat comprising, in combination, a temperature responsive element, a control mechanism including a lever for operating said mechanism, one end of said lever being connected to said temperature responsive element for operation thereby, a pair of fulcrum members spaced along said lever for coaction therewith, said members being so arranged that said lever operates said mechanism as a first class lever when one of said members is used and as a second class lever when the other of said members is used to thereby reverse the sequence of operation of said thermostat, and means for causing said lever to selectively pivot about one or the other of said fulcrum members.

4. A thermostat comprising a bimetal strip pivotally mounted at one of its ends, a lever hingedly attached to the other end of said strip, said lever including an operating portion, a pair of fixed fulcrum members, one of said members being arranged for fulcruming said lever on one side of said operating portion and the other of said members being arranged for fulcruming said lever on the other side of said operating portion, and means for moving said bimetal strip relative to said fulcrum members so that said lever may normally fulcrum about a selected one of said fulcrum members.

5. In a control device having a base, a condition responsive element, spaced pivot means for connecting said element to said base, a control mechanism, means for connecting said element in operative relation to said mechanism, said connecting means including a lever means selectively operable as a first class lever or as a second class lever to thereby operate said control mechanism in one direction or another upon motion of said element in one direction, pressure operated means for moving one of said pivot means for determining the class of operation of said lever means, and manually adjustable means for moving another of said spaced pivot means for determining the value of said condition at which said mechanism is operated.

6. In a pneumatic control device, a base, a condition responsive element, a pair of spaced pivots for attaching said element to said base, a control mechanism, mechanical means for connecting said element in operative relation to said mechanism, said connecting means including a lever selectively operable as a first class lever or as a second class lever to thereby operate said control mechanism in one direction or another upon motion of said element in one direction, and means for shifting one of said spaced pivots to thus shift said element relative to said mechanism and thereby determine the class of operation of said lever means.

7. In a control device having a base, a condition responsive element, a control mechanism, a pair of spaced pivots for attaching said element to said base, means for connecting said element in operative relation to said mechanism, said connecting means including a lever selectively operable as a first class lever or as a second class lever to thereby operate said control mechanism in one direction or another upon motion of said element in one direction, means for shifting one of said spaced pivots for adjusting said control device to operate at predetermined values of said condition, and means for shifting the other of said spaced pivots a predetermined amount to select the class of operation of said lever to thereby determine the operating sense of said device.

8. In a control device having a base, a condition responsive element, spaced shiftable pivot means for attaching said element to said base, a control mechanism, means for connecting said element in operative relation to said mechanism, said connecting means being capable of operating said mechanism in either of two directions upon movement of said element in one direction, means for changing the operative position of one of said pivot means for determining the values of said condition at which said mechanism will operate, and means for varying the relation between said element and said mechanism a relatively large and predetermined amount by changing the position of another of said pivot means a predetermined amount for thus determining the direction of operation of said mechanism relative to the direction of operation of said element.

9. In a control device, a control member having a control portion, spaced pivot means for coacting with said control member at points spaced from the control portion thereof in opposite directions, movable condition responsive means connected to said control member at another point spaced from the control portion thereof so that movement of said condition responsive means upon change in the value of the condition to which it responds in one direction causes movement of said control portion about one of said pivot means in a first direction, and means for shifting the operative relation of said spaced pivot means so that movement of said condition responsive means in the same direction causes movement of said control portion in a direction opposite to said first direction.

FREDERICK D. JOESTING.

REFERENCES CITED

The following references are of record in the file of this patent:

UNITED STATES PATENTS

| Number | Name | Date |
| --- | --- | --- |
| 2,064,175 | Otto | Dec. 15, 1936 |
| 2,141,464 | Gorrie | Dec. 27, 1938 |
| 2,285,513 | Harris | June 9, 1942 |
| 2,310,293 | Joesting | Feb. 9, 1943 |